(12) United States Patent
Wienke et al.

(10) Patent No.: US 8,870,504 B2
(45) Date of Patent: Oct. 28, 2014

(54) CARGO NET

(75) Inventors: Dietrich Wienke, Elsloo (NL); Roelof Marissen, Born (NL)

(73) Assignee: DSM IP Assets B.V., Heerlen (NL)

( * ) Notice: Subject to any disclaimer, the term of this patent is extended or adjusted under 35 U.S.C. 154(b) by 237 days.

(21) Appl. No.: 13/000,440

(22) PCT Filed: Jun. 23, 2009

(86) PCT No.: PCT/EP2009/057770
§ 371 (c)(1),
(2), (4) Date: Mar. 28, 2011

(87) PCT Pub. No.: WO2009/156377
PCT Pub. Date: Dec. 30, 2009

(65) Prior Publication Data
US 2011/0176883 A1 Jul. 21, 2011

(30) Foreign Application Priority Data
Jun. 23, 2008 (EP) .................... 08011340

(51) Int. Cl.
*B60P 7/08* (2006.01)
*B60R 21/06* (2006.01)

(52) U.S. Cl.
CPC .............. *B60R 21/06* (2013.01); *B60P 7/0876* (2013.01); *B60P 7/0823* (2013.01)
USPC .................. 410/118; 410/97; 87/2

(58) Field of Classification Search
CPC ........ B60P 7/04; B60P 7/0876; B60P 7/0869; B60P 7/16; B60R 21/06; B60R 7/005
USPC ............. 410/96, 97, 100, 117, 118; 87/2, 12; 296/100.16; 24/265 CD
See application file for complete search history.

(56) References Cited

U.S. PATENT DOCUMENTS 3,312,181 A * 4/1967 Davidson ........................ 410/97
4,413,110 A 11/1983 Kavesh et al.
4,900,204 A 2/1990 Summers (Continued)

FOREIGN PATENT DOCUMENTS

DE 198 35 230 2/2000
EP 0 213 208 3/1987

(Continued)

OTHER PUBLICATIONS

International Search Report for PCT/EP2009/057770, mailed Sep. 25, 2009.

*Primary Examiner* — Stephen Gordon
(74) *Attorney, Agent, or Firm* — Nixon & Vanderhye P.C.

(57) ABSTRACT

A net is provided having a plurality of net members, the net members being arranged in a lattice structure and having a thickness (D1). The net is further provided with attachment devices having a thickness (D2) which are connected to the net members, the thickness (D2) of the attachment devices being larger that the thickness of the net members (D1) at least at the places of connection through which loads are transmitted between the net members and the attachment devices. The ratio between the thickness of the net members and the thickness of the attachment devices (D1/D2) is at least 1.15. The net is useful as a barrier net to secure an off-limits area and as a cargo net to restrain cargo movement on a platform of a pallet.

11 Claims, 3 Drawing Sheets

(56) References Cited

U.S. PATENT DOCUMENTS

| | | | |
|---|---|---|---|
| 4,992,015 A * | 2/1991 | Florence | 410/104 |
| 5,328,310 A * | 7/1994 | Lockney | 410/97 |
| 5,848,864 A | 12/1998 | Selby | |
| 6,443,489 B1 | 9/2002 | Ehrenberger | |
| 7,204,457 B2 | 4/2007 | Ackerman et al. | |

FOREIGN PATENT DOCUMENTS

| | | |
|---|---|---|
| EP | 0 205 960 | 10/1990 |
| EP | 0 200 547 | 7/1991 |
| EP | 0 472 114 | 4/1999 |
| EP | 1 464 914 | 2/2006 |
| EP | 1 440 882 | 4/2006 |
| EP | 1 470 044 | 4/2006 |
| EP | 1 699 954 | 11/2011 |
| GB | 2 042 414 | 9/1980 |
| GB | 2 051 667 | 1/1981 |
| WO | 91/12136 | 8/1991 |
| WO | 01/73173 | 10/2001 |
| WO | 02/062619 | 8/2002 |
| WO | 03/045779 | 6/2003 |
| WO | 2004/011331 | 2/2004 |
| WO | 2007/147594 | 12/2007 |

* cited by examiner

CARGO NET

This application is the U.S. national phase of International Application No. PCT/EP2009/057770, filed 23 Jun. 2009, which designated the U.S. and claims priority to European Application No. 08011340.0, filed 23 Jun. 2008, the entire contents of each of which are hereby incorporated by reference.

The invention relates to a net comprising a plurality of net members, said members being arranged in a lattice structure and having a thickness $D_1$, wherein the net further comprises attachment means having a thickness $D_2$ and being connected to said members. The invention also relates to the use of the net as a barrier net to secure an off-limits area and as a cargo net to secure and restrain movement of a cargo on e.g. a platform or a pellet.

An example of such a net used to secure cargo is disclosed for instance in WO 02/062619, the bottom edges of the net being provided with securement devices in order to secure the net to the platform or pallet supporting the cargo.

Many other examples of nets and in particular of cargo and barrier nets are known, such nets traditionally comprise a network of net members lined up vertically and horizontally and stitched together to form patterns as for example rectangular or spider-web like patterns. These nets are also provided with attachment means for attaching them to supports, platforms or pallets or for keeping them taut.

It was observed however, that the current nets have a reduced capability to distribute loads uniformly on the attachment means and hence, certain net members are subjected to excessively high loads at the place of connection between the net members and the attachment means. These places of connections represent the weakest spots in the net where the net members fail first, ultimately leading to entire net failure.

Therefore, it was observed that the efficiency of the known nets, i.e. the ratio between the strength of the net and the strength of the net members, is reduced.

Different net designs were proposed as a solution to alleviate the above mentioned drawbacks and to improve net efficiency as for example novel net designs like those disclosed in EP 1,470,044. However, the problem of unequal load distribution on the net members is still present and negatively affects net's efficiency. Said problem affects all nets to a more or less pronounced extent irrespectively of the net design and it stems mostly from a deficient net installation.

Adjusting the net design also makes the net less versatile because the net has to be redesigned for every different application in view of the intended use. This leads to complex and expensive nets.

Another approach commonly used in the art for strengthening the weakest spots of the net viz. the net members, is to use more material when constructing thereof and therefore making said members thicker. Hence, the known nets use net members that are thicker than said means, this leading to heavy net members and to a large increase in the weight of the net. An additional disadvantage thereof is that the net becomes difficult to manipulate and lacks versatility.

The aim of the invention is to provide a net which does not show the above enumerated drawbacks, or it shows them to a lesser extent. In particular, the aim of the invention is to provide a net having an improved efficiency when compared to known nets. It is also aimed to provide a net having an improved efficiency even when the net is not properly installed.

It is also an aim of the invention to provide a net that is more versatile in that it can be used for diverse applications without the need of redesigning it for each and every application and without compromising its efficiency.

It is also an aim of the invention to provide a cargo net which has a higher safety factor, i.e. it is less prone to fail or break when subjected to high loads.

The invention therefore provides a net characterized in that the thickness $D_2$ of the attachment means is larger than the thickness $D_1$ at least at the place or places of connection through which loads are transmitted between said members and said means and wherein the ratio $D_2/D_1$ is at least 1.15.

It was observed that the net of the invention when used in different applications, e.g. for restraining cargo or as a barrier net to secure an off-limits area, it has an increased efficiency when compared to commonly used nets. It was also observed that even if not properly installed, e.g. when slack is present in the mounted net, the net of the invention shows an improved efficiency as compared with known nets, minimizing therefore the risk of net failure.

It was also observed that the net of the invention is able to sustain impact loads better than the known nets without being damaged. Impact loads may be caused for example by a sudden shift in the cargo due to uncontrolled movements of the vehicle or aircraft carrying the cargo. Therefore the inventive net has an improved safety factor (as defined hereinafter) with regard to known nets.

The advantages of the solution proposed by the present invention come more as a surprise as they go against the common beliefs in the art. As detailed above, in an attempt to reinforce the net members at the connection between thereof and the attachment means, the known nets use net members that are thicker than the attachment means and are even made thicker to improve the performance of the net. The invention however, uses net members that are thinner than the attachment means and as demonstrated in the experimental section hereinafter a net with improved performance as well as improved efficiency and safety is obtained.

Preferably, the ratio $D_2/D_1$ is at least 1.2, more preferably at least 1.5, even more preferably at least 3.0, even more preferably at least 4.5, yet even more preferably at least 6.0, most preferably at least 8.0. It was observed that the advantages of the invention become more pronounced and better results are obtained with increasing said ratio, in particular the efficiency of the net increases. Although an upper limit need not be imposed, for practical reasons, the ratio $D_2/D_1$ is preferably at most 50, more preferably at most 40, most preferably at most 30. The ratio $D_2/D_1$ can easily be adjusted by varying the thicknesses of the net members and/or the attachment means.

A net member may be suitably constructed from lengths of rope, strap, metallic fibre cables, natural and/or synthetic fibres, textile cloth or a combination thereof. Therefore the net member may comprise lengths of rope, strap, metallic fibre cables, natural and/or synthetic fibres, textile cloth or a combination thereof. Preferably, the net members comprise yarns containing synthetic filaments. This has the advantage that the net is lightweight, it has a high strength and a good corrosion resistance.

By a plurality of net members it is meant that sufficient net members are used such that they form a lattice structure also known as a mesh. Said members may slide freely in respect with each other or they may be joined at intervals by stitching or by other fixation means, e.g. metal rings, knots, adhesives and the like. The lattice structure may be any structure known in the art, e.g. rectangular, diamond, circular and the like. The preferred lattice structure is rectangular because it was observed that a net wherein the net members are arranged in such a manner shows an improved capacity of evenly distributing the loads to which the net is subjected.

In a preferred embodiment of the invention, the net comprises net members containing a length of a rope. The rope may be of any known construction in the art, e.g. a twisted or braided rope or combinations thereof, e.g. twisted yarns subsequently braided to form the rope.

In a further preferred embodiment of the invention, the net comprises net members containing a length of a strap. By strap is herein meant a flexible, elongated body having a thickness (t) that is much smaller than its width (w). A strap is readily made for example by weaving, plaiting or knitting yarns into any construction known in the art, e.g. a plain and/or twill weave construction for instance. The strap preferably has an n-ply textile webbing construction where n is preferably at least 4, more preferably 3 and most preferably 2. Such webbing construction has the advantage that it provides the net members with increased strength.

If lengths of rope, strap, or natural or synthetic fibre material are used as net members, said lengths are preferably manufactured from yarns comprising natural and/or synthetic filaments. Examples of natural materials that may be used to manufacture the filaments of the yarns include cotton, hemp, wool, silk, jute and linen. Synthetic yarns may be produced according to any technique known in the art, preferably by melt, solution or gel spinning. Examples of synthetic, also known as polymeric, materials suitable for producing the filaments of said yarns include polyamides and polyaramides, e.g. poly(p-phenylene terephthalamide) (known as Kevlar®); poly(tetrafluoroethylene) (PTFE); poly(p-phenylene-2, 6-benzobisoxazole) (PBO) (known as Zylon®); liquid crystal polymers such as for example copolymers of para hydroxybenzoic acid and para hydroxynaphtalic acid291900 (e.g. Vectran®); poly{2,6-diimidazo-[4,5b-4',5'e]pyridinylene-1, 4(2,5-dihydroxy)phenylene} (known as M5); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyolefins, e.g. homopolymers and copolymers of polyethylene and polypropylene; but also polyvinyl alcohols and polyacrylonitriles. Also combinations of yarns manufactured from the above referred polymeric materials can be used for manufacturing the links.

In a preferred embodiment, the polymeric material of choice for producing said yarns is ultra high molecular weight polyethylene (UHMWPE) having an IV of preferably between 3 and 40 dl/g as determined according to ASTM D4020 at 135° C. using decalin as solvent for UHMWPE. Preferably, the UHMWPE has less than 1 side chain per 100 C atoms, more preferably less than 1 side chain per 300 C atoms as such material provides the yarns with increased mechanical properties. The advantage of a net comprising net members containing yarns manufactured from UHMWPE is that said net has in addition to an increased efficiency, also an improved abrasion resistance, strength and very importantly an increased strength to weight ratio. Therefore, the versatility of said net is improved.

The UHMWPE yarns are preferably manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "Advanced Fibre Spinning Technology", Ed. T. Nakajima, Woodhead Publ. Ltd (1994), ISBN 185573 182 7. The advantage thereof is that nets wherein gel spun UHMWPE yarns are used in the net members of the net, have an even further increased efficiency.

The net of the invention comprises attachment means, as for example hooks and/or floor fittings adapted to engage complementary devices on a platform or on a pallet. Other examples of said means include but are not restricted to lashing lines or corner ties used to releasable secure together adjacent net panels; securement devices comprising for example a projection extending from an edge of the net and an eye associated with the projection and located on a meeting edged thereof such that the meeting edges are releasable held together; tensioning devices as for example reefing hooks which can be used to tension the net and take up slack in the net.

The attachment means may be manufactured from a variety of materials as for example synthetic and/or natural yarns as exemplified above; metal; and/or thermoplastic and/or thermosetting resin compositions as disclosed by WO 91/12136 A1 (pages 15-21) incorporated herein by reference. Preferably said means have an oval, more preferably a circular cross-section at least at the place or places of connection through which loads are transmitted between the net members and said means.

In a preferred embodiment of the invention, the attachment means are manufactured from a thermosetting resin containing a filler. Preferably, said resin is an epoxy resin and the filler is carbon nanotubes. The advantage thereof is that such a means has improved mechanical properties while being lightweight.

In a more preferred embodiment of the invention, the attachment means are manufactured from a light weight metal, e.g. aluminum, titanium, scandium, magnesium, zinc and/or alloys thereof. The advantage thereof is that the weight of the net is further decreased. Of particular interest are standard wrought, cast or other aluminum alloys, for example alloys available under Aluminum Association (AA) designations 6061, 2024, 7075, 7079 and A 356. More preferably said means are cast out of magnesium or magnesium alloys, e.g. Al—Sc—Mg alloy. An advantage thereof is that magnesium based means have an increased strength to weight ratio. This is beneficial in application where transportation of heavy cargo is involved; as such nets comprising magnesium based attachment means contribute less to the total weight to be transported while preserving the efficiency of the net.

The place of connection through which loads are transmitted between the attachment means and the net members is herein understood the place at which said means and said net members are in connection with each other and through which the loads acting on said net member are transmitted to said means or vice versa. An eloquent example thereof is that of a hook attached to a net member, the hook having the prescribed thickness at least at the place where the member connects or positions itself thereof when the net is under tension. In particular, when the hook is used to take up slack in the net, it is preferred that the hook has the prescribed thickness also at the place where it hooks around the net members forming other parts of the net in order to make a tuck and thereby tensioning the net for example over the cargo.

The attachment means are preferably connected to the net members by known fixation means as for example stitching, splicing, knotting or even adhesives. For example, when straps are used as net members, the preferred fixation means are stitches, because they can be easily applied in a well-controlled manner at the desired location. When ropes are used as said members, the preferred fixation means are splices because a fixation having an increased efficiency is obtained.

The net of the invention may be of any configuration known in the art as for example from EP 1,440,882; EP 1,464,914; WO 2007/147594; WO 02/062,619; U.S. Pat. No.

7,204,457; WO 03/045,779; WO 04/011,331 the disclosures of which are hereby incorporated by reference. If the net of the invention is used as a cargo net, preferably said net has a one-piece construction of cruciform shape having a center section or central panel section, with a plurality of wing sections or side flaps extending outwardly therefrom. An example of such a net is disclosed in WO 02/062,619.

The net of the invention may also be coated with or contain flame retardants, coatings to reduce adhesion, colorants, delusterants, and the like.

Hereafter, the figures are explained without limiting however the invention thereto.

Figure 3:
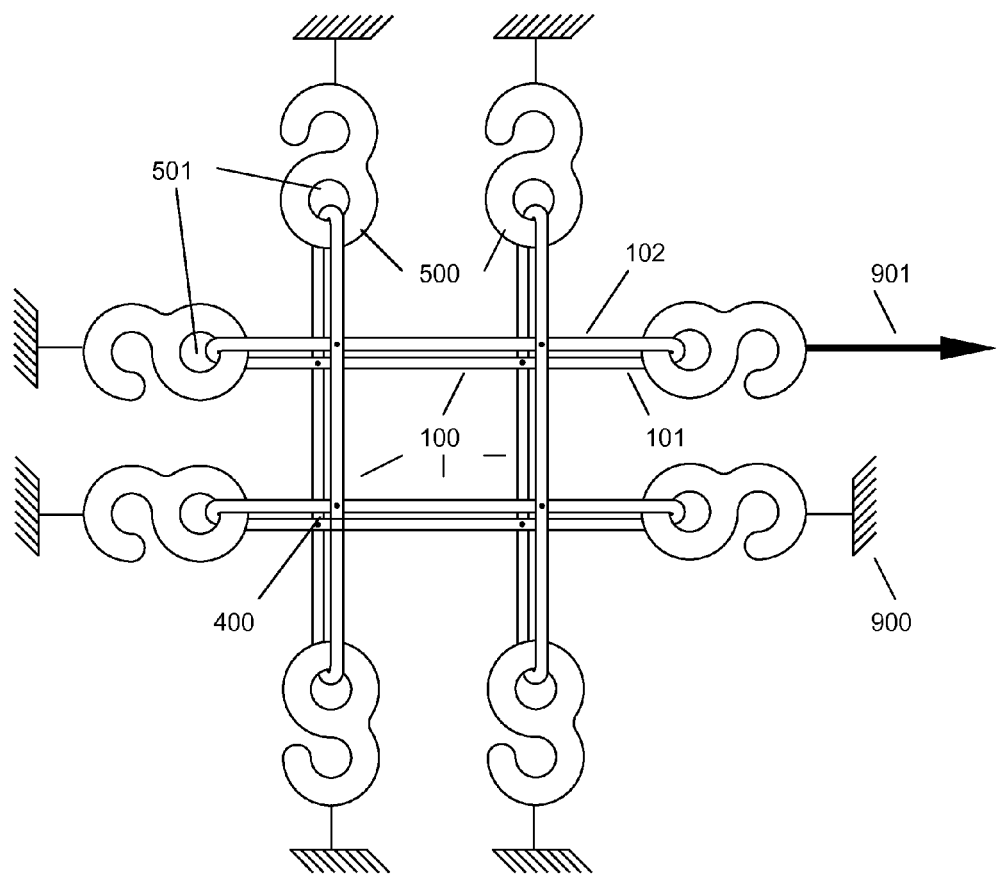

FIG. 3 schematically depicts a net constructed from four net members, each net member having an attachment means connected to each of its ends thereof.

Figure 1:
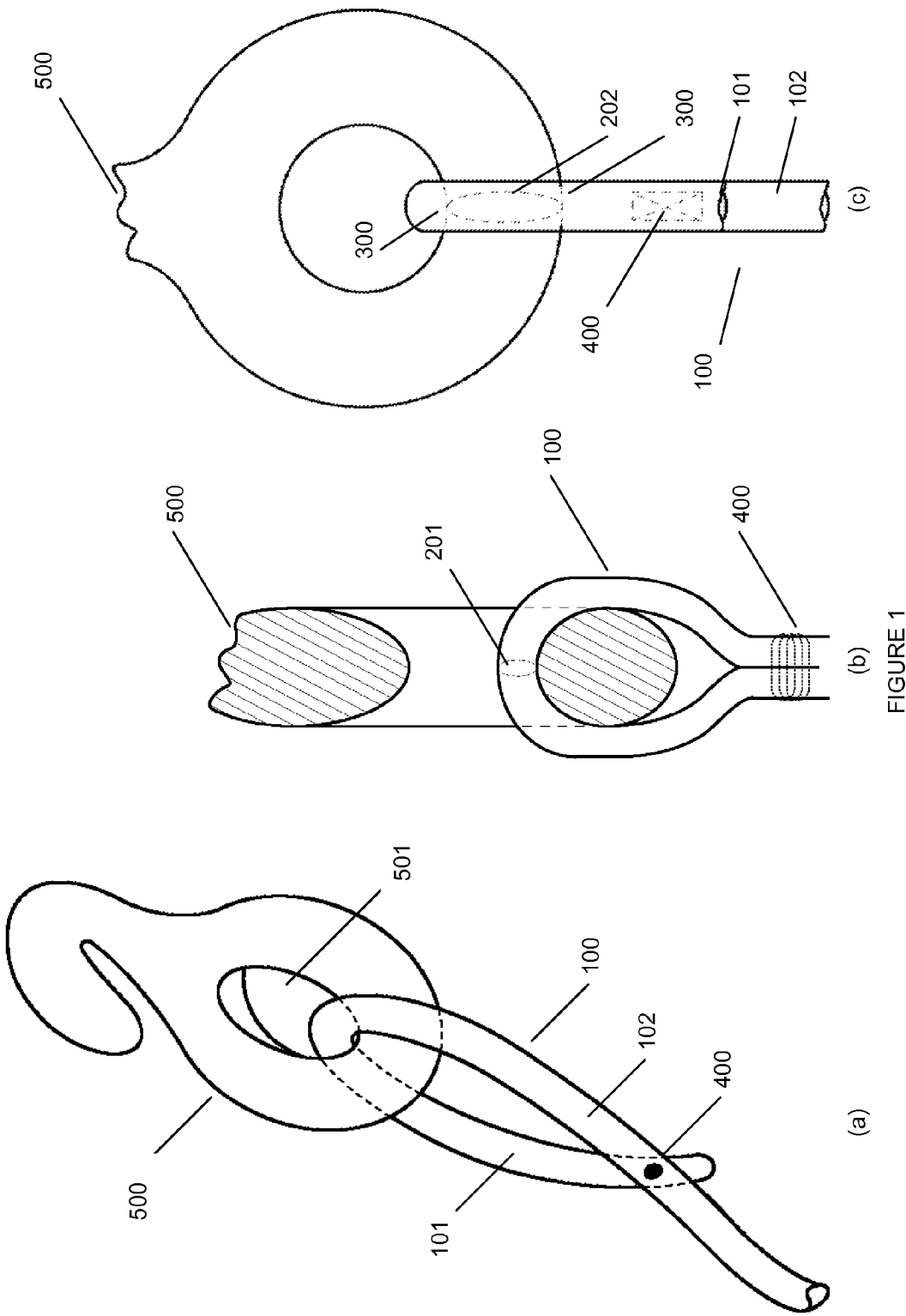
FIG. 1 depicts a) a connection between a net member and an attachment means and perpendicular b) and parallel c) cross-sections through the connection.

The thickness $D_1$ of a net member (100) is defined as exemplified in FIGS. 1a)-c), as the thickness of said member at the place (300) where it interconnects with the attachment means (500) and through which the loads acting on said member are transmitted to said means or vice versa. The thickness $D_1$ is measured when the net is under no load and by keeping taut the net member to be measured and if applicable also the means. The thickness $D_1$ of the net member is measurable through a cross-section (201) of said member perpendicular to the place (300) where the member interconnects with the means. By keeping the member taut is herein understood that said member is subjected to a load sufficient to prevent it from slacking but not strong enough to induce deformation thereof. In particular if the member has a circular cross-section, the thickness $D_1$ is the diameter thereof. The thickness $D_2$ of an attachment means is measured analogously through its cross-section (202) at the place of interconnection (300). In FIG. 1 a), the member (100) is connected to the attachment means (500) by threading a length (101) through an opening (501) in the attachment means and fixing said length to the body (102) of said member by a fixation means (400), e.g. stitching.

Figure 2:
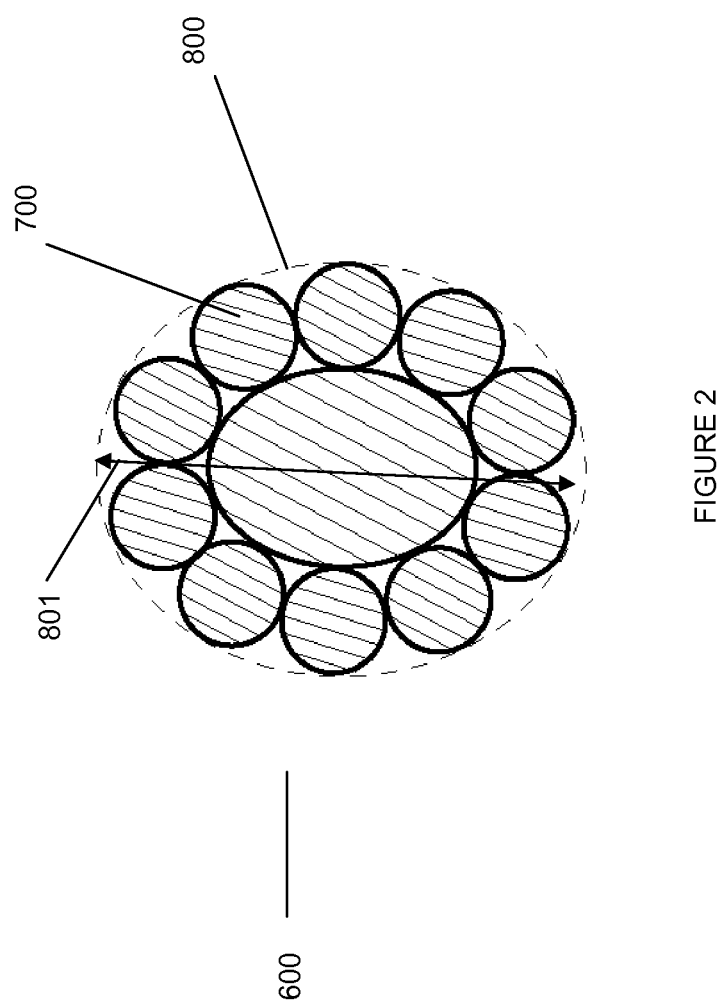
FIG. 2 depicts a cross-section through a net member manufactured of a rope, the rope having an irregular cross-section.

It is possible that a member or attachment means has an irregular cross-section. This is the case of FIG. 2 where the member is constructed from a rope (600), the irregularities of the cross-section stemming from the outward protrusions of strands (700) of the rope. In this case it is more accurate to approximate the cross-section thereof with an ellipse (800) and to use an axis (for example 801) of the ellipse perpendicular to the place where the rope connects with the attachment means to define the thickness of the irregular member. Oval cross-sections (not shown in the Figures) may also be approximated with an ellipse and use the methodology defined above to measure their thickness. In case of attachment means of irregular cross-section, the same methodology may be used for defining the thickness of said means.

When a strap is used to manufacture the net members, by thickness $D_1$ of the net member is herein understood the thickness (t) of the strap. If overlapping lengths of a strap are used to construct said member, the thickness $D_1$ is the thickness (t) of the strap multiplied with the number of overlapping lengths at the place of connection, or when lengths of straps of unequal thickness are used, the thickness $D_1$ is the sum of all thicknesses of the overlapping straps at the place of connection.

In a preferred embodiment of the invention, the attachment means are tensioning devices used to tension the net and take up slack in the net by connecting or hooking around net members forming other parts of the net in order to make a tuck and thereby tensioning the net. Preferably, the tensioning devices are hooks, preferably manufactured from magnesium or magnesium alloys. The advantage thereof is that when the net according to this embodiment is used as a cargo net and is tensioned over the cargo to secure it in place, the net presents an increased safety factor. It was observed that the net presents less or no damages when subjected to high stresses from the cargo, especially at the locations where the tensioning devices, e.g. the hooks, are attached to the net members. Preferably, the net of this embodiment also comprises attachment means mounted preferably at the periphery of the net for attaching the net to a platform or a pallet. The advantage thereof is that such net has a further increased efficiency.

The invention also relates to the use of attachment means in nets wherein said means have a thickness of at least 1.2 times the thickness of the net members at least at the place or places of connection through which loads are transmitted between said members and said means. Preferably, the attachment means are tensioning devices; more preferably said means are hooks. Preferably they are made by a lightweight metal.

The invention also relates to the use of the net of the invention as a cargo net or as a barrier net.

The invention is further explained with the help of the following experiments and comparative examples, without being however limited thereto. Because the connections between the attachment means and the net members are the weakest spots in a net, the efficiency of the net was considered improved when the efficiency of said connection is increased.

Methods

Efficiency (in %) of a net is determined by measuring the tensile strength ($TS_{member}$) of the net members and the tensile strength of the net ($TS_{net}$) and using Formula 1:

$$\text{Efficiency}(\%) = \frac{TS_{net}}{2 \times TS_{member}} \times 100 \quad \text{Formula 1}$$

$TS_{member}$ of a net member is determined by testing according to the standard ISO 2307. If the net member comprised high strength polyethylene fibers, in particular UHMWPE fibers, the test was slightly modified in that the testing rate was reduced with a factor 5. Because of their increased stiffness, said polyethylene fibers break at a relatively low strain, therefore, in a rather short time when a normal clamping displacement rate is applied. The decreased testing rate is chosen in order to achieve a sufficiently long testing time for various measurements and observations to be made.

$TS_{net}$ was determined on a net was constructed according to FIG. 3, the net having four identical net members (100). The net members were manufactured from a rope by threading a free end thereof through the openings (501) of two hooks (500) and connecting it with the other free end by a splice (not shown) to form a loop having two lengths (101) and (102) thereof. The corresponding lengths (101) and (102) of each net member are connected to each other at cross-overs by fixation means (400). The hooks (500) are attached to a fixed support (900) such that the net members are kept taut without however loading said members. A randomly chosen hook from the eight hooks available is connected to a tensile tester (not shown in FIG. 3) and subjected to a load (901) in order to simulate an uneven load distribution on the net members. The $TS_{net}$ is the load at which the net fails, i.e. the load at which the loaded net member breaks. In Formula I, the factor 2 was used due to the fact that both lengths (101) and (102) of the net member contribute to carrying the load.

The safety factor of the net is defined as the ratio between the tensile strength of the net ($TS_{net}$) as measured according to the above detailed method and the maximum tensile strength at which the net is intended to be used.

EXAMPLES AND COMPARATIVE EXPERIMENT

Example 1

A net according to FIG. 3 was made from net members manufactured from a rope of thickness $D_1$ of about 5.5 mm. The rope was manufactured from gel spun UHMWPE yarns (sold by DSM Dyneema, the Netherlands as Dyneema® SK75) and had a configuration 3×12×5280 dtex, i.e. a 3 strand laid rope, each strand made by laying 12 yarns, each yarn having 5280 dtex. The strength of the rope measured according to the modified ISO 2307 was about 45 kN. The four net members were connected to each other by sewing through the members.

The hooks used as attachment means were manufactured from an aluminum 2024T3 alloy sheet, by milling. All hooks had a circular cross section at the place of connection with the rope and a thickness $D_2$ of 15 mm. Their weight was 56 g. For this embodiment the ratio $D_2/D_1=15/5.5$ was 2.7.

The efficiency of the net measured according to the technique described above in the METHODS section was 71%.

Comparative Experiment 1 (CE1)

Example 1 was repeated, however, steel hooks milled from common construction steel were used instead of the aluminum ones. The thickness of the steel hook was 5.5 mm. The weight of the hook was 60 g. For this embodiment the ratio $D_2/D_1=5.5/5.5$ was 1.

The efficiency of the net was 48%.

Example 2

Example 1 was repeated, however, hooks having a circular cross-section and being manufactured from magnesium were used instead of the aluminum ones. The thickness (diameter) $D_2$ of the magnesium hooks was 16 mm. The weight of the magnesium hooks was 40 g. For this embodiment the ratio $D_2/D_1=16/5.5$ was about 3.

The efficiency of the connection was 72%.

Example 3

Example 1 was repeated, however, a woven strap instead of a rope was used to construct the net members and as attachment means hooks with a thickness of 7 mm were used.

The woven strap (2-ply webbing) was made from the Dyneema® SK75 multifilament yarns of Example 1. The thickness (t) of the strap was 1.5 mm and its width 8.5 mm. The linear density of the woven fabric in the warp direction was 11900 tex. Its breaking strength was 21 kN.

For this embodiment the ratio $D_2/D_1=7/1.5$ was about 4.7. The efficiency of the net was 86%.

Comparative Experiment 2 (CE2)

Example 3 was repeated, however, high strength steel hooks with a thickness of 1.5 mm were used. For this embodiment the ratio $D_2/D_1=1.5/1.5$ was 1.

The efficiency of the net was 47%.

From the examples and comparative experiments presented above, it can be seen that the efficiency of the net increases by increasing the ratio $D_2/D_1$. It can be also seen that by using lightweight attachments means, a net having an increased efficiency as compared to known nets was produced while having a reduced weight thereof.

Therefore, the net of the invention therefore can be utilized under increased loading conditions without the occurrence of failures or breakages. Therefore, the net of the invention while being lightweight has an improved safety factor.

The invention claimed is:

1. A net comprising:
a plurality of net members, and
attachment devices selected from the group consisting of hooks, floor fittings, lashing lines, corner ties and tension devices, wherein
the net members comprise lengths of ropes arranged in a lattice structure and having a thickness $D_1$, and wherein
the attachment devices are connected to the net members at respective places of connection through which loads are transmitted between the net members and the attachment devices, and wherein
the attachment devices have a thickness $D_2$ which is larger than the thickness $D_1$ of the net members at least at the respective places of connection through which loads are transmitted between the net members and the attachment devices, and wherein
the thicknesses $D_1$ and $D_2$ are respectively measured through a cross-section of the net members and the attachment devices perpendicular to the respective places of connection through which loads are transmitted between the net members and the attachment devices, and wherein
the ratio $D_2/D_1$ is at least 3.0.

2. The net according to claim 1, wherein the attachment devices comprise hooks formed from Mg or an alloy of Mg.

3. A cargo pallet comprising a pallet, cargo on the pallet and a net as in claim 1 to secure the cargo on the pallet.

4. The net of claim 1, in the form of a barrier net to secure an off-limits area.

5. The net of claim 1, wherein the ratio $D_2/D_1$ is at least 4.5.

6. The net of claim 1, wherein the ratio $D_2/D_1$ is at least 6.0.

7. The net of claim 1, wherein the ratio $D_2/D_1$ is at least 8.0.

8. The net of claim 1, wherein the ratio $D_2/D_1$ is at most 50.

9. The net of claim 1, wherein the ratio $D_2/D_1$ is at most 40.

10. The net of claim 1, wherein the ratio $D_2/D_1$ is at most 30.

11. The net of claim 1, wherein the attachment devices are reefing hooks.

* * * * *